(12) United States Patent
Magruder et al.

(10) Patent No.: US 7,324,970 B2
(45) Date of Patent: Jan. 29, 2008

(54) HOME ASSET MANAGEMENT ACCOUNT

(75) Inventors: Brian Magruder, Des Moines, IA (US); Doreen Oakes, Eagan, MN (US); Adam Epstein, Martinez, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1300 days.

(21) Appl. No.: 10/072,729

(22) Filed: Feb. 7, 2002

(65) Prior Publication Data

US 2003/0149656 A1 Aug. 7, 2003

(51) Int. Cl.
*G06Q 40/00* (2006.01)
(52) U.S. Cl. .......................................... 705/38; 705/38
(58) Field of Classification Search ................... 705/38
See application file for complete search history.

(56) References Cited

U.S. PATENT DOCUMENTS

| | | | | |
|---|---|---|---|---|
| 4,876,648 | A | 10/1989 | Lloyd | 364/408 |
| 5,220,501 | A | 6/1993 | Lawlor et al. | 364/408 |
| 5,673,402 | A | 9/1997 | Ryan et al. | 395/238 |
| 5,689,649 | A | 11/1997 | Altman et al. | 395/236 |
| 5,852,811 | A | 12/1998 | Atkins | 705/36 |
| 5,866,889 | A | 2/1999 | Weiss et al. | 235/379 |
| 5,870,721 | A * | 2/1999 | Norris | 705/38 |
| 5,884,285 | A | 3/1999 | Atkins | 705/36 |
| 5,911,136 | A | 6/1999 | Atkins | 705/36 |
| 5,946,668 | A * | 8/1999 | George | 705/36 R |
| 5,966,700 | A | 10/1999 | Gould et al. | 705/38 |
| 5,991,745 | A | 11/1999 | Kiritz | 705/38 |
| 6,012,044 | A | 1/2000 | Maggioncalda et al. | 705/36 |
| 6,012,047 | A | 1/2000 | Mazonas et al. | 705/38 |
| 6,049,782 | A | 4/2000 | Gottesman et al. | 705/35 |
| 6,076,072 | A | 6/2000 | Libman | 705/34 |
| 6,108,641 | A * | 8/2000 | Kenna et al. | 705/35 |
| 6,131,810 | A | 10/2000 | Weiss et al. | 235/379 |
| 6,167,384 | A | 12/2000 | Graff | 705/35 |
| 6,192,349 | B1 * | 2/2001 | Husemann et al. | 705/65 |
| 6,202,054 | B1 | 3/2001 | Lawlor et al. | 705/42 |
| 6,233,566 | B1 | 5/2001 | Levine et al. | 705/37 |
| 6,253,191 | B1 | 6/2001 | Hoffman | 705/35 |
| 6,269,347 | B1 | 7/2001 | Berger | 705/38 |

(Continued)

OTHER PUBLICATIONS

*Home Mortgages Can be More Than Just Debit*- Michael A. Johnston; Manage; Aug./Sep. 2000.

(Continued)

*Primary Examiner*—James A. Kramer
*Assistant Examiner*—Lindsay M. Maguire
(74) *Attorney, Agent, or Firm*—Michael A. Glenn; Glenn Patent Group

(57) ABSTRACT

A method and apparatus for a home asset management account system is provided that combines a first mortgage account and an equity line of credit (LOC) and offers a periodic sweep feature between the first mortgage and equity LOC, a periodic property value review feature of the first mortgage, and a statement feature that provides a customer valuable information on the subject property estimated value and the relationship between the first mortgage and the equity LOC. The first mortgage and equity LOC results from a proprietary automated decisioning/pricing system, the periodic sweep feature, the periodic property value review feature, and a unique statement feature are bundled into a financial package available for customers.

24 Claims, 8 Drawing Sheets

U.S. PATENT DOCUMENTS 6,345,262 B1 * 2/2002 Madden ........................ 705/38
7,089,202 B1 * 8/2006 McNamar et al. ............ 705/35

OTHER PUBLICATIONS

*Home Equity Lending-* Glenn B. Canner, and Charles A. Luckett; Federal Reserve Bullentin; May 1989.

*Online Financial Essential Internet Services (includes related articles on web sites with investment tools and advice, retirement planning, tax preparation, home buying, insurance and online trading as well as the Editor's Choice):* Jan Ozer; PC Magazine; Feb. 24, 1998.

*Portfolio Accounting/Management Systems*; Wall Street & Technology; Annual 1994.

*Need $10,000? $50,000? $250,000? (Finding the right source for cash for a small business)*; Linda Stern; Home Office Computing; Sep. 1992.

*Financial Managers: Keeping Track of Your Personal Accounts*; Donald B. Trivette; PC Magazine; Dec. 27, 1988.

*Debit's on Top: Products and Services Growth Trends*; Mary Mink; Credit Union Executive; Nov./Dec. 1994.

*Wholesale Giants*; Tom Lamalfa; Mortgage Banking; May 1995.

*Recent Developments in Home Equity Lending*; Glenn B. Canner, Thomas A. Durkin, Charles A. Luckett; Federal Reserve Bulletin; Apr. 1998.

Böheim et al., *Residential Mobility, Housing Tenure and the Labour Market in Britain*, Feb. 28, 2000, Institute for Social and Economic Research and Institute for Labour Research, University of Essex, Colchester, Essex, England.

Canner et al., *Recent Developments in Home Equity Lending*, Federal Reserve Bulletin: Apr. 1998.

Cole et al., *The Effects of Changes in Ownership Structure on Performance: Evidence from the Thrift Industry*, Federal Reserve System, Washington, DC., 1996.

Cummins et al., *Corporate Hedging in the Insurance Industry: The Use of Financial Derivatives by US Insurers*, Sep. 19, 1996, The Wharton School, University of Pennsylvania, Philadelphia, PA.

Gelfand et al., *Spatio-Temporal Modeling of Residential Sales Data*, 1995.

Iversen, Edwin S. Jr., *Spatially Disaggregated Real Estate Indices*, Jun. 9, 1999.

Oldfield et al., *The Place of Risk-Management in Financial Institutions*, The Wharton School, University of Pennsylvania, Philadelphia, PA. 1997.

Roll, Richard, *Benefits for Homeowners From Mortgage Portfolios Retained by Fannie Mae and Freddie Mac*, 2003, Journal of Financial Services 23:1 29-42, Kluwer Academic Publishers, The Netherlands.

Roll, Richard, *Benefits for Homeowners From Mortgage Portfolios Retained by Fannie Mae and Freddie Mac*, Allstate Professor of Finance, University of California, Los Angeles. 2003.

Shiller et al., *Moral Hazard in Home Equity Conversion*, Jan. 4, 1998, Presented at AREUEA-ASSA Session, Chicago, Illinois.

Tay, Leo Constantino, *A Mean Value-At-Risk Framework for Speculating and Hedging with Options*, Mar. 8, 2001, Economics Dept., Ateneo de Manila University.

* cited by examiner

VII. DETAILS OF TRANSACTION

| | | |
|---|---|---|
| A. PURCHASE PRICE | | 100000.00 |
| B. ALTERATIONS, IMPROVEMENTS, REPAIRS | | 0.00 |
| C. LAND (IF ACQUIRED SEPARATELY) | | 0.00 |
| D. REFINANCE (MORTGAGES, 2NDS, HELOCS TO BE PAID OFF) | | 0.00 |
| E. ESTIMATED PREPAID ITEMS | E. DETAILS | 0.00 |
| F. ESTIMATED CLOSING COSTS | F. DETAILS | 0.00 |
| G. PMI, MIP FUNDING FEE | G. DETAILS | 0.00 |
| H. DISCOUNT | H. DETAILS | 0.00 |
| BUYDOWN SUBSIDY | | 0.00 |
| I. TOTAL COSTS (ITEMS A THROUGH H) | | 100000.00 |
| J. SUBORDINATE FINANCING | J. DETAILS | 20000.00 |
| K. BORROWER'S CLOSING COSTS PAID BY SELLER/LENDER | | 0.00 |
| L. OTHER CREDITS | L. DETAILS | 0.00 |
| M. LOAN AMOUNT (EXCLUDE PMI, MID, FUNDING FEE FINANCED) | | 100000.00 |
| N. PMI, MIP FUNDING FEE FINANCED | | 0.00 |
| O. LOAN AMOUNT (ADD M & N) | | 0.00 |
| P. CASH FROM/TO BORROWER | | 8000.00 |

[PRINT] [DETAILS OF TRANSACTION CALCULATORS...] [CALCULATE]
[PREVIOUS] [NEXT] [OK] [CANCEL]

*FIG. 1*

| DETAILS OF TRANSACTION CALCULATOR (2 OF 7) |

NEW HOME EQUITY FINANCING TERMS

PRODUCT  PAYMENT OPTION
[LINE ▽]  [INTEREST ONLY ▽]

TOTAL LOAN/LINE AMT   AMT DISBURSED   LIEN POSITION
[20000]                [20000]         [2 ▽]

PURPOSE                    INTEREST RATE  TERM    PMT DUE DATE  CREDIT GRADE
[PARTIAL PURCHASE MONEY ▽] [6]           [120 ▽] [28]          [G50]

DEFERRED ORIG FEE      ACH
[DO NOT WAIVE FEE ▽]   [YES ▽]

— 230

HOME ASSET MANAGEMENT FEATURES  — 210

SWEEP      ● YES  ○ NO     ANNUAL REVIEW  ● YES  ○ NO

220 — OTHER SUBORDINATE FINANCING TOTALS [NEW OR EXISTING]

LINE BALANCE(S):  LINE PYMT(S):  LINE LIMITS(S):
[20000]           [567.00]       [20000]

LOAN BALANCE(S):  LOAN PYMT(S):
[0.00]            [0.00]

— 240

[PREVIOUS]  [NEXT]  [CLOSE]  [CANCEL]

*FIG. 2*

LOAN TO VALUE CALCULATOR

| | |
|---|---|
| PURCHASE PRICE | 100000.00 |
| APPRAISED VALUE | 100000.00 |
| BASE LOAN AMOUNT | 80000.00 |
| SUBORDINATE FINANCING | 10000.00 |
| LOAN TO VALUE | 80.0000 |
| COMBINED LTV % | 90.0000 |

| PURCHASE | APPRAISAL | MORTGAGE AMOUNT | LTV% | CLTV% |
|---|---|---|---|---|
| 100,000.00 | 100,000.00 | 80,000.00 | 80.00 | 90.00 |

COPY　　CLEAR　　EXIT

SUBORDINATE FINANCING SCREEN-SUBJECT PROPERTY

510 — NEW SUBORDINATE FINANCING LIEN (HOME EQUITY)

PRODUCT  PAYMENT OPTION  LOAN OR LINE

AMT DISBURSED  TOTAL LOAN/LINE AMT  TERM  LIEN POSITION

PURPOSE  ACH  PAYMENT DUE DATE

WAIVE DEFERRED ORIG

520 — HOME ASSET MANAGEMENT FEATURES

SWEEP  ● YES  ○ NO  ANNUAL REVIEW  ● YES  ○ NO

530 — OTHER NEW FINANCING TOTALS (NON-HOME EQUITY)

LINE(S): BAL(S)  PYMT (S)  LINE LIMIT(S)

LOAN(S): BAL(S)  PYMT (S)

OTHER FINANCING EXISTING

LINE(S): BAL(S)  PYMT (S)  LINE LIMIT(S)

LOAN(S): BAL(S)  PYMT (S)

PREVIOUS  NEXT  CLOSE  CANCEL

*FIG. 5*

HOME ASSET MANAGEMENT ACCOUNT

BACKGROUND OF THE INVENTION

1. Technical Field

The invention relates to home asset management. More particularly, the invention relates to a system and method for providing a bundled home asset management package to customers.

2. Description of the Prior Art

Traditional home financing typically combines a traditional home mortgage and a variety of home equity products or programs, such as home equity loans and home equity lines of credit. An application is required for each home mortgage and for each home equity product and they typically have different points of sale. Also, payments for each are typically unrelated. In short, such home mortgage and home equity products are established, treated, and maintained independently.

Recently, some systems have been proposed to combine home mortgages with other investment vehicles. One such system creates mortgage plans based upon mortgages that are at least partially collateralized by investment vehicles (U.S. Pat. No. 4,876,648). Also, a personal financial management system has been suggested which applies client funds that would normally be used to amortize a mortgage to instead increase the value of a designated asset account.

Clarke B. Lloyd, *System and Method for Implementing and Administering a Mortgage Plan*, U.S. Pat. No. 4,876,648 (Oct. 24, 1989) discloses a computerized mortgage implementing a system including a central service computer that helps establish and maintain mortgage plans based upon mortgages that are at least partially collateralized by investment vehicles. Both investment vehicle information and mortgage information are stored in the service computer. Borrower information is entered in the service computer when a mortgage plan is to be established and one of the groups of investment information is selected. Thus, a desired amount of the investment funding is determined for helping repay the mortgage plan. Mortgage implementing information is generated for a given mortgage plan, and is sent to a mortgage lender computer to facilitate the establishment of the mortgage plan.

Lloyd teaches a new methodology for acquiring a mortgage and for its subsequent payment. Nowhere does Lloyd teach or even suggest immediate availability of a customer's equity through mortgage principal paydown or property value increases throughout part of or all of the life of the mortgage.

Robert Altman, John W. Cleary, and Morris Markowitz, *System for Operation of a Combination Mortgage, Equity Load and Savings Plan*, U.S. Pat. No. 5,689,649 (Nov. 18, 1997) disclose a nest egg mortgage which combines the benefits of a conventional home mortgage, a home equity loan, and an individual retirement account (IRA). Altman et al teach operating and implementing a nest egg mortgage plan that comprises determining an amount of mortgage for which an applicant qualifies, and a predetermined term of repayment of principal therefor based on conventional lending practices, creating an accelerated payment schedule for the mortgage so that the principal is repaid within a shorter time than the predetermined term of the mortgage, applying the difference between the accelerated payments and non-accelerated payments as a source of equity, providing an equity loan against the source of equity, and applying the loan to generate an investment vehicle. The amounts placed in the investment vehicle increase in value over the term of the mortgage while the equity loan and mortgage principal are repaid to the lending institution by the end of the term of the mortgage. Nowhere does Altman et al teach or even suggest immediate availability of a customer's equity through mortgage principal paydown or property value increases throughout part of or all of the life of the mortgage.

Lawrence Weiss and Marylou Dowd, *Integrated Full Service Consumer Banking System and System and Method for Opening an Account*, U.S. Pat. No. 5,866,889 (Feb. 2, 1999) and U.S. Pat. No. 6,131,810 (Oct. 17, 2000) disclose an integrated financial system that includes a single customer account permitting a customer to perform various financial transactions. The account includes banking and brokerage components. A consistent user interface means is provided to allow a customer to access the account from different sources, such as an automatic teller machine, a phone and a personal teller transaction. The account is flexible enough to include a variety of other components, such as a credit card component, a line of credit component, a secured credit component and a money market component. A system and method for opening a single integrated account for a customer in a single session is also described. However, nowhere does Weiss et al teach or even suggest immediate availability of a customer's equity through mortgage principal paydown or property value increases throughout part of or all of the life of the mortgage.

Sidney Gottesman, Darlene Shuman, Patricia Eletto, Ben Gurdus, Bob Santariello, Jay Murthy, and Michael Spivak, *Relationship Management System and Process for Pricing Financial Instruments Based on a Customer's Relationship with a Financial Institution*, U.S. Pat. No. 6,049,782 (Apr. 11, 2000) disclose a system and process for use by a financial institution to facilitate relationship pricing in connection with a single account that includes a plurality of account components, including a checking component, a savings component and a investment component. The system includes software engines operated on specially programmed general purpose computers. The engines are subsystems that generate input and drive another sub-system or the product processors. The overall function of the engines is to allow, among other things, pricing to be determined based on a customer's total individual or household relationship to the financial institution. The preferred system includes a rate engine, a pricing engine, a linkage engine, a balance engine, and a cycle engine.

Michael A. Johnston, *Home Mortgages Can be More Than Just Debit*; Manage (August/September 2000) teaches combining mortgage with a home equity line of credit by financing up to eight-five percent of the home's purchase price.

Glenn B. Canner, Thomas A. Durkin, and Charles A. Luckett, *Recent Developments in Home Equity Lending*, Federal Reserve Bulletin (April 1998) disclose several new types of home financing loans.

Glenn B. Canner and Charles A. Luckett, *Home Equity Lending*, Federal Reserve Bulletin (May 1989) teach that the home equity loan market is dominated by depository institutions, especially commercial banks and to a lesser extent savings institutions. Canner et al continue to say that some relative specialization by type of home equity loan product is observable among creditors. In particular, finance companies have an insignificant role in the market for home equity lines of credit. Among depository institutions, commercial banks and savings institutions have roughly equal shares of market for traditional home equity loans, but banks are the predominant source of credit lines, accounting for fifty-four percent of the total market.

While the prior art references address specific aspects of home asset management components, none of the prior art references provide a program designed to meet changing credit needs experienced by the vast majority of consumers. Such needs vary based on demographic characteristics, attitudes towards credit, household composition, and stage of life. It would be advantageous therefore to provide a program targeted toward a wide range of customers, such as, for example, first time homebuyers, move-up homebuyers, and empty nesters. Further, it would be advantageous to provide availability of maximum equity in a borrower's subject property at all times by performing an automatic process that sweeps principal paydowns from first mortgage into home equity products, as well as line increases based upon the appreciation of the subject property value. From a company's point of view, it would be advantageous thereby supporting customer retention.

SUMMARY OF THE INVENTION

A method and apparatus for a home asset management account system is provided that comprises a first mortgage account and a second subordinate financing account (referred to as an equity line of credit or equity LOC), a periodic sweep feature between the first mortgage account and equity LOC, a periodic property value review feature, and a statement feature that provides a customer valuable information on the relationship between the first mortgage and equity LOC accounts. The first mortgage and equity LOC accounts decisioned and priced by proprietary systems, the periodic sweep feature, the periodic property value review feature, and a unique statement feature are bundled into a single financial package available for customers. The equity LOC account in one preferred embodiment is a renewable home equity line of credit providing a combined loan to value (CLTV) from 0.01% to 100% at time of loan closing, and allows the customer to convert portions of the line to fixed rate loans. The periodic sweep feature preferably performs a quarterly principal sweep from the first mortgage account to the equity LOC account. The periodic property value review feature preferably is performed annually.

BRIEF DESCRIPTION OF THE DRAWINGS

FIG. 1 is a screen print of the details of a transaction incorporating subordinate financing (equity LOC) for subject property according to the invention;

FIG. 2 is a screen print of the details of a transaction calculator incorporating subordinate financing (equity LOC) for subject property according to the invention;

FIG. 3 is a screen print of the loan to value calculator according to the invention;

FIG. 5 is an example of a subordinate financing (equity LOC) screen for subject property according to the invention;

DETAILED DESCRIPTION OF THE INVENTION

Overview

Figure 4:
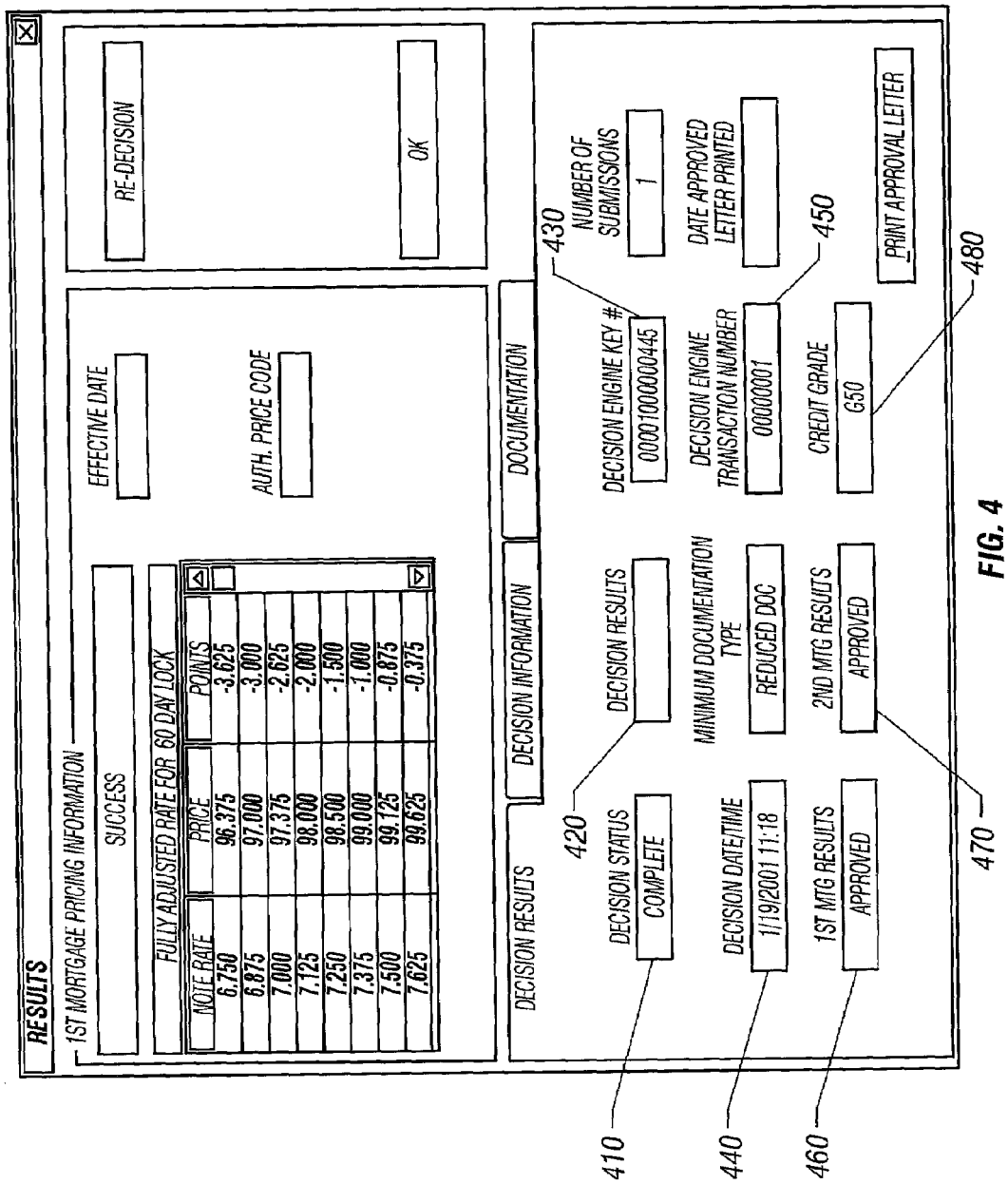
FIG. 4 is a screen print of the results of applying for a combined loan according to the invention.

A method and apparatus for a home asset management account system is provided that comprises a first mortgage account and a second subordinate financing account (referred to as an equity line of credit or equity LOC), a periodic sweep feature between the first mortgage account and equity LOC, a periodic property value review feature, and a statement feature that provides a customer valuable information on the relationship between the first mortgage and equity LOC accounts. The first mortgage and equity LOC accounts, decisioned and priced by proprietary systems, the periodic sweep feature, the periodic property value review feature, and a unique statement feature are bundled into a single financial package available for customers. The equity LOC account in one preferred embodiment is a renewable home equity line of credit providing a combined loan to value (CLTV) from 0.01% to 100% at time of loan closing, and allows the customer to convert portions of the line to fixed rate loans. The periodic sweep feature preferably performs a quarterly principal sweep from the first mortgage account to the equity LOC account. The periodic property value review feature preferably is performed annually.

Details of the sweep process, the annual property value review process, a quarterly position statement, and an exemplary decisioning and pricing system are provided in their respective sections below.

The preferred embodiment of the invention provides the following features:

The customer completes one loan application;

The customer has a single point of contact for processing;

The customer receives one automated underwriting decision;

The customer receives one loan approval communication, i.e. delivered together, but documents remain separate;

The customer attends one loan settlement, i.e. a simultaneous closing;

The customer has a single point of contact for general servicing questions, such as via a toll-free number;

An annual review of credit and property value is performed and if the customer passes such annual review, the customer's line of credit is increased to an established maximum CLTV to take advantage of the increased value of their property;

Credit line increases based on principal reduction process, i.e. principal reduction sweeps, or simply, sweeps. That is, as the principal balance on a first mortgage is paid down, a home equity line of credit increases, the increase amount can reach the upper limit of approved credit limits;

The principal reduction sweep preferably occurs on a quarterly basis.;

Increases to the credit line are based on the annual review of credit and property values. The available credit line can increase or have no change, i.e. the available credit line does not decrease solely due to property value decreasing. It should be appreciated that the line of credit can decrease as with all other equity line accounts if it is necessary due to changes in customer credit deterioration, e.g. if customer goes bankrupt or does not make payments;

The customer receives communication regarding the sweeps and annual review results via a quarterly sweep statement (QSPS) and an annual property valuation statement (ARPS). It should be appreciated that increases on the quarterly sweep and the annual review position statements are conditional increases. That is, if borrower does not rescind, non-conditional increases are communicated to customer with the next statement;

The base equity line product is an equity line account with a convertibility feature which provides the customer the ability to convert portions of their equity line to loans with a fixed interest rate and term. The customer may maintain up to preferably 3 loans at a time, with a preferable maximum of 8 loans over 10 years;

An expanded array of mortgage products is available including most or all conforming and non-conforming conventional products;

The customer may receive card access to their equity line funds, as well as convenience checks;

Automated decisioning and pricing capabilities are provided at the point of sale (POS) and operations;

A one-time automated application information feed from established data centers or systems for home asset management account loans, as well as other types of loans that are simultaneous close loans;

Facilitating enhanced sales and operations communication between users by providing daily loan status updates on the equity LOC and mortgage application, such as updates on the equity LOC from a home equity system to a home mortgage retail system and vice versa;

Automated pricing for both the mortgage and equity LOC at the point of sale and operations;

Enhanced marketing and retention functionality to identify and appropriately segregate the home asset management account customers; and Automated population of first mortgage and second LOC delinquency account information on existing collections systems, such as an internal collections web site.

An equally preferred embodiment of the invention provides a monthly billing statement for the home asset management account program to include both the first mortgage and equity LOC information.

An equally preferred embodiment of the invention provides performing the periodic sweep on a monthly basis.

The home asset management account program provides many benefits and savings to the customer as well as to the business at hand. Following are two lists, one for the customer and the other for the business, of examples of benefits and savings according to the preferred embodiment of the invention.

Customer Benefits and Savings

Provides a "credit for life" type of program designed to meet the changing credit life cycle needs of customers;

Provides simplicity and ease of use functionality for customers, such as automatic line increases and one time closing;

Provides customers with flexibility and choice by allowing customers to be able to access their equity when and how they want;

Provides the security of equity loans being available for future emergencies or other financial needs;

Allows customers to save time and money in the future by not having customers re-apply for line increases or refinance to take advantage of property appreciation;

Provides point of sale credit decisioning and application pricing of the mortgage and equity line for the customer, Allows customers to save money by converting outstanding equity line balances to loans in an increasing rate environment;

Provides customers with a credit product that provides financial management capabilities they control;

Provides customers with key information regularly regarding the equity of their home, their first mortgage and equity LOC information;

Allows customers within different life stages, also known as segmentation, to benefit from the product;

Allows customers to understand the features better and to see the product in a new light through the periodic sweep position statement; and Annual review position statement provides customers with estimated change in property value as based on a market index value.

Business Benefits and Savings

Creates increased market and volume opportunities;

Creates synergies between mortgage and home equity stand-alone programs, resulting in a tailored credit vehicle that provides long term customer appeal;

Allows both home mortgage and home equity departments to increase their respective market share of customers, at least due to link between the mortgage and equity LOC account;

Increases equity LOC utilization, improves customer retention and creation of new cross-sell opportunities;

Increases referrals between various home asset management components, such as mortgage, equity, and banking;

Automatic transmission of data between home mortgage and home equity systems eliminates manual processing, thereby reducing overall cost-to-acquire. Increases sales and operational efficiencies and positions businesses for future joint program offerings and cross-sell opportunities;

Increases sales and operational efficiencies by automating the pricing and decisioning processes of the equity LOC in conjunction with a mortgage application. Provides point of sale credit decisioning of the mortgage and equity line;

Improves consistency of credit decisioning and pricing through automation;

Improves home mortgage systems' and home equity systems' operational efficiencies by sharing key data across entities in order to better serve customers;

Provides ability to identify current home mortgage and home equity customers to further enhance marketing, retention, and cross-sell efforts;

By providing customers with position statements, continues to build strong customer relationships;

Strengthens and solidifies relationship with the customer;

Reduces customer attrition due to tie-in of mortgage, equity programs, and other products;

Provides a "new category" of home financing;

Increases market share by accommodating consumers with different ranges of comfort with home equity borrowing. Allowing penetration of middle segment customers;

Improves home mortgage and home equity operational efficiencies; and

Streamlines home mortgage sales processes for origination of home equity subordinate financing, i.e. equity LOC and/or simultaneous closes.

According to the preferred embodiment of the invention, the home asset management account program meets the changing credit needs experienced by the vast majority of consumers. These needs vary based on demographic characteristics, attitudes towards credit, household composition, and stage of life. The program is targeted toward a wide range of customers for example:

First time homebuyers;

Move-up homebuyers; and

Empty nesters.

According to the preferred embodiment, some assumptions are made for the success of the home asset management account program. Following is a list of some examples of such assumptions according to the preferred embodiment of the invention:

The first mortgage and equity LOC must maintain salability of the first account into the secondary market, i.e. mortgage, and bank portfolio on the second account;

The first mortgage and the equity LOC are priced as separate products and the pricing of each is competitive, i.e. not negatively impacted; and The mortgage component is responsible for the credit risk on the first mortgage and the equity component is responsible for the credit risk on the equity LOC;

The Sweep Feature

The preferred embodiment of the invention provides a periodic sweep feature that is preferably, but not limited to, quarterly, and that increases available dollars on a equity LOC as principal on the first account, or mortgage is paid down. That is, as the principal on the first mortgage decreases with monthly payments or additional principal reduction, such dollars are swept into the available balance for the equity LOC. It should be appreciated that the second account can be of another type such as other home equity products, and the like. It should further be appreciated that at least one subordinate financing is used, but that the invention can incorporate more than one subordinate financing.

Following is a list of high level business and technical requirements of the home asset management account program and/or its components for the sweep process as according to the preferred embodiment of the invention:

The sweep process occurs periodically, preferably, but not limited to, quarterly for all home asset management account loans. In an equally preferred embodiment, the periodic sweep process occurs monthly. For purposes of simplicity of discussion herein, whenever reference is made to quarterly sweeps, it should be appreciated that other rates of the sweep, such as monthly, are included in the discussion and are within scope of the invention;

Check that the first mortgage is current. Omit from the sweep process those mortgage accounts that are not current. Capture the first mortgage principal payment information from first mortgage home asset management accounts and those that have a principal reduction since the last reporting or sweep;

Timing of capture of the principal payment information from the first mortgage may consider that at least eleven business days are required for checks to clear and thereby avoids sweeping a non-sufficient funds (NSF) principal pay-down amount;

Check that equity LOC account is current and omit from the sweep process those that are not current, wherein the definition of current is receipt of payment in less than or equal to 29 days from due date and not current is receipt of payment greater than or equal to 30 days from due date;

The amount of principal reduction is the dollar amount to be captured and added to the equity LOC;

The transmission of the principal reduction from first mortgage to equity LOC will need to occur for all current home asset accounts;

The increase from the transmission of the first mortgage principal reduction will be added to the equity LOC available credit;

Exception processing reports are produced for appropriate support departments to review and resolve errors and omissions;

Ability to manually post a sweep transaction;

Solution consists of a Java-based tool that combines mortgage and home equity data for each home asset account and filters the data through necessary processes to determine the amount of the quarterly sweep;

Solution utilizes a database that contains data gathered from a mortgage servicing system and an equity account transaction system;

The database and associated processes will identify home asset management account customers eligible for an increase in their equity LOC;

The database and processes will update and interface with the equity account system, requiring the transactional information;

The database will need to maintain the quarterly amount swept and use those amounts in the calculation for the recording of liens within an annual property value review process; and Lien recording to occur upon occurrence of set credit risk parameters.

Following are some assumptions for the sweep process according to the preferred embodiment of the invention:

There are no state specific legal issues regarding this sweep function and one process can be built for all states;

A single point of contact servicing site can provide customer service for the sweep process;

Bimonthly payments does impact the sweep process;

First mortgage information can remain on the preexisting mortgage system and/or database and the equity LOC can remain on the preexisting equity system and/or database;

The annual property value review and sweep functions are separate processes; and The preexisting mortgage and equity systems contain all data necessary to perform the sweep function.

It should be appreciated that an important customer benefit is the ability of the consumer to immediately utilize available equity LOC increase on a quarterly basis as the principal pay-down occurs on the first mortgage.

Following is a description of various logical and system dependencies of the various components of the home asset management account program and some external accounts or systems as according to the preferred embodiment of the invention.

The annual property value review process is dependent upon the sweep process. The sweep process must be functional to fully engage the annual property value review process. Additionally, the annual property value review process has references to the sweep process;

The periodic, preferably quarterly position statement process is dependent upon the sweep process. The results of the sweep process provide information that appears on the periodic, or quarterly position statement;

Data fields identified within this home asset management account program may need to be added to various systems, applications, and for automated data feed processes; and The sweep process is also dependent upon the accurate identification of a home asset management account loan. The expanded mortgage products and programs can help deliver options to the customer under the home asset management account program.

An Exemplary Sweep Process

Described below is the sweep process flow according to the preferred embodiment of the invention.

- Identify home asset management account loans on the preexisting mortgage system;
- Home asset management account loans and all necessary data fields per mortgage account are pulled into extract file;
- Identify home asset management account loans on the preexisting equity system;
- Home asset management account loans and all necessary data fields per equity account are pulled into extract file;
- All home asset management account loans from the preexisting mortgage system and the preexisting equity system extract files are merged/compared and stored in an intersect database;
- A sweep mismatch report is produced for all accounts not matching on the preexisting mortgage and the preexisting equity systems. This report is reviewed for accuracy. Problem resolution is detailed as an exception process;
- Home asset management mortgage accounts with a zero principal balance are excluded from the sweep process and are populated with a zero principal balance on first reason code;
- Home asset management equity accounts are filtered or tested for the sweep flag equal to No in the preexisting equity system;
- Home asset management equity accounts with No set in the sweep flag field are excluded from the sweep process at this point and populated with a sweep flag set to no reason code;
- Home asset management mortgage accounts are filtered or tested for bankruptcy status;
- Home asset management mortgage accounts that are in bankruptcy status for the first are excluded from the sweep process at this point and are populated with a bankruptcy on the first mortgage reason code;
- Home asset management mortgage accounts are filtered or tested for foreclosure status;
- Home asset management mortgage accounts that are in foreclosure for the first are excluded from the sweep process at this point and are populated with a foreclosure on the first mortgage reason code;
- Home asset management mortgage accounts are filtered or tested for current status on first mortgage. Current status on the first mortgage is defined as follows: if the current month is beyond the due month then the loan is not current. Payment must be received on or before end of the month of the due date month to consider the account current;
- Home asset management mortgage accounts that are not current on the first mortgage are excluded from the sweep process at this point and populated with a not current on the first mortgage reason code;
- Home asset management equity accounts are filtered or tested for current status on the equity LOC;
- Home asset management equity accounts that are not current for the equity LOC are excluded from the sweep process at this point and are populated with a not current on the equity LOC reason code;
- A sweep failure report is produced for all accounts that failed the filters and were not swept. Such report is reviewed and action is determined as defined in an exception business process;
- The first mortgage principal pay down amount is identified and rounded down to the nearest dollar for all merged and matched accounts that have passed all filters and tests;
- The first mortgage principal pay down amount is swept and the available equity LOC amount on the preexisting equity system is increased. The transaction history is reflected within the preexisting equity system;
- For all account records that failed to sweep, information regarding the reason code, definition of the reason code and associated date are logged as a transaction visible to a customer service representatives and to equity LOC underwriters;
- The business is able to retrieve historical changes to accounts that failed to sweep. The historical information preferably includes reason code and date of sweep failure and is available to respond to customer requests;
- The business is able to retrieve historical changes to the sweep yes/no flag, the corresponding date, and whether its status has changed by customer request or a business decision. It is preferable to track the status of the sweep Y/N field, to track why it was turned off and if it is available to turn on or off by customer choice; and
- It is preferable to have ad hoc sweep or manual sweep functionality for records that were corrected (needed intervention) as a result of the sweep mismatch report.

It should be appreciated that in the preferred embodiment of the invention any mismatch issue prevents the mismatched mortgage or equity record from participating in the sweep process. Research preferably is completed and any necessary corrections made prior to the next sweep cycle.

The preferred embodiment of the invention provides a sweep summary report. Data to be reported includes, but is not limited to:

- Quarter of the sweep process;
- Total number of loans processed for the sweep process;
- Total number of loans with successful sweeps;
- Total number of loans that failed the sweep process because of test/filter failure;
- Sub-total number of failed for sweep loans for each reason code; and
- Frequency of report. Quarterly after each sweep.

It should be appreciated that the home asset management account database and transaction process be flexible and large enough to support significant volume and multiple home products.

Following are preferred states and/or assertions about the availability of the home asset management account system and/or its components:

- Users are provided with the ability to create read only queries from the appropriate database(s) during normal business hours;
- The sweep function can be run on or after a sufficient amount of time to allow determining non-sufficient funds.

Statement cut off for transactions is a known date constraint;

The sweep transaction should occur at approximately the same time each period and before the statement cutoff date; and The sweep process is preferably a batch run, as a night-time process in an 8-12 hour window.

It has been found that data archiving has advantages. Information pertaining to the sweep is cumulative and provides a history of sweeps for each account record. The data is retained and archived for the life of the loan/line and the minimum amount of time for data archive after the loan/line has been paid off and closed. Purge process follows results/process according to the particular business' needs. Customer service should also have access to such archived data.

The preferred embodiment of the invention also incorporates the following:

Quarterly sweeps are automated with no manual intervention necessary for the normal process;

If the sweep calculation results in a negative amount, no sweep takes place, i.e. no decrease in the line takes place;

There are multiple reasons why the paid down principal on the first mortgage may not get swept into the equity LOC account. These reasons are tracked and documented on the appropriate systems. It is preferred that once all issues are resolved which prevented the sweep from occurring, all un-swept months of paid down principal are reflected within the equity LOC. Such is also true for the situation where a customer requested the sweep to be turned off and subsequently turned back on at a later date. The months that the sweep was turned off will be swept into the equity LOC, pending checks against limitations imposed by filters;

Customer service centers are equipped to handle customer calls regarding the sweep process;

Customers that wish to apply for increases to the equity LOC, outside the sweep and annual property review processes discussed above, are treated within the particular current business process in place for the equity LOC. If denied for a line increase, operations receives such information as an escalation to determine whether to cease sweeps. A sweep flag is maintanenced manually to No and sweeps are thus turned off as a result of the activity. A corresponding value is thus entered into a home asset management account status field, and the corresponding date is recorded. It should be appreciated that other means can be provided to ensure that the sweep process operates properly according to the positive and/or negative results of the underwriting activity.

Business procedures and processes can further be developed and to define work and research to be conducted by customer service representatives for the sweep mismatch report and the sweep failure report; and Business procedures and processes can further be developed to define work and research to be conducted to increase the equity LOC for all paid In full accounts that have not been refinanced and wherein customers desire the equity LOC increase.

It should be appreciated that the sweep process preferably runs within an eight-hour window on or about the eleventh of the final month in the calendar quarter for quarterly sweeps, or more generally, after sufficient time to properly determine the case of non-sufficient funds. Performance preferably is adequate to provide a one night processing window. Failure preferably results in a run on the subsequent processing day. Scheduling preferably takes into account the statement run, i.e. sweep processing precedes the statement run.

Following are example scenarios according to a preferred embodiment of the invention using sweeps.

Scenario #1—Customer is current;
Customer is DUE September 2001;
Customer pays on time on September 2015;
When payment is posted on the home mortgage system LAST PAYMENT shows Sep. 15, 2001;
And the DUE turns to the next due date which is October 2001;
On October $11^{th}$ or thereabouts, the extract file is pulled and the sweep function is run; and
The test for Current on the first Mortgage for this account record is DUE (month only) 10 minus LAST PAYMENT (month only) 9=1.

Scenario #2—Customer is one month behind;
Customer is DUE on September 2001;
Customer pays late on October 2003;
When payment is posted on the home mortgage system LAST PAYMENT shows Oct. 3, 2001;
(They made their September payment late and did not make their October payment);
The DUE reflects the next due date which is October 2001;
On October $11^{th}$ the extract file is pulled and the sweep function is run;
The test for Current on the first Mortgage for this account record is:
DUE 10 minus LAST PAYMENT 10=0; and
Result is not equal to 1 therefore the customer is not current.

Scenario #3—Customer is two months behind;
Customer DUE shows February 2001 (Their next due date is February 2001);
Customer pays their February payment late on April 2010;
When the payment is posted on the home mortgage system LAST PAYMENT shows Apr. 10, 2001;
The DUE reflects Mar. 1, 2001, which is the next due date;
On May $11^{th}$ the extract file is pulled and the April sweep function is run;
The test for Current on the first Mortgage for this account record is:
DUE 3 minus LAST PAYMENT 4=−1; and
Result is not equal to 1 therefore the customer is not current.

Scenario #4—Customer was behind and catches up;
Customer DUE shows Apr. 1, 2001;
Customer pays April, May and June payments to bring account current on Jun. 10, 2001;
When the payments are posted on the home mortgage system LAST PAYMENT shows Jun. 10, 2001. And the DUE moves to Jul. 2001;
On July $11^{th}$ the extract file is pulled and the June sweep is run;
The test for Current on the first Mortgage for this account record is:
DUE 7 minus LAST PAYMENT 6=1; and
Result is equal to 1 and the account is current.

Scenario #5—Customer pays ahead;
Customer DUE shows Oct. 1, 2001;
Customer pays ahead October and November payments on October 2003;
When the payments are posted on the home mortgage system LAST PAYMENT shows October 2003 and the DUE moves to December 2001;

On November 11$^{th}$ the extract file is pulled and the October sweep is run;

The test for Current on the first Mortgage for this account record is:

DUE 12 minus LAST PAYMENT 10=2; and

Result is greater than 1 and the account is current.

Annual Property Review Feature

The preferred embodiment of the invention provides an annual property review system and process that determines the customer's credit worthiness and evaluates the subject property to identify the estimated current property value using an indexed property value to determine if the equity LOC qualifies for an increase. That is, in general terms the annual property review feature of the home asset management account program according to the preferred embodiment of the invention provides for increasing the available dollars on the equity LOC, on an annual basis as the collateral property appreciates if the customer meets established credit criteria. Appreciation values, established using property index values, are provided by an outside service. If all criteria are met, the available equity LOC is increased by the amount indicated by the indexed property appreciation.

Following is a list of high level business and technical requirements according to the preferred embodiment of the invention:

- An application is provided to query specific data and perform the annual review process to determine the amount of the annual review increase;
- The database contains data gathered from the mortgage system, the home equity system, a predetermined property index vendor, and a credit source;
- The database and processes will update the home equity database accordingly with the necessary transactional information;
- The process includes, but is not limited to:
  - Performing credit evaluation review on the borrower;
  - Valuation review of the property;
  - Data that can be used to record a new lien on all loans based on predetermined credit criteria, such as, for example, with an increase in value greater than 25% of last recorded value, and equal or greater than $25,000; and
  - Communication of annual review; and
- Previous swept amounts with the amount determined by the annual review is included when determining whether a new lien is required.

The preferred embodiment of the invention assumes the following:

- First mortgage customers are not allowed to drop private mortgage insurance (PMI) solely on the index valuation. Customer must meet the investor's guidelines for dropping mortgage insurance;
- A proprietary index valuation is available for this process; and
- Fields to store annual review results are added to the database.

It should be appreciated that a benefit to the customer is the means to provide the customer availability of maximum equity up to the corresponding CLTV limit in the borrower's subject property at all times, provided an increase index valuation. A benefit to a company is increased customer retention.

An Exemplary Property Value Annual Review Process

Described below is the property value process according to the preferred embodiment of the invention. It should be appreciated that while specific terminology and implementations are used, such as, where anniversary date equals the current month, the invention is not limited by such terminology and implementation, but rather it is the concept that is being described. Clearly, similarly used terminology and implementations can have similar results and effects and be within the scope of the claimed invention.

- Identify home asset management account loans on the equity system where anniversary date equals the current month. Read the home mortgage system loan number on the equity system. Identify all home asset management account loans on the equity system that are due an annual property review. Accounts are due an annual property review in the anniversary month. The anniversary date is defined as the equity system origination note date. The annual review process runs monthly and selects all accounts due for review in their anniversary month;
- Home asset management account records from the equity system and all necessary data fields per account are pulled into extract file;
- Identify only the home asset management account loans on the home mortgage system that were identified in the above to be pulled into the extract file, i.e. account records that are due an annual review with the home mortgage system loan number in the equity system;
- Home asset management account records identified above from the mortgage system and all necessary data fields per account are pulled into extract file;
- All home asset management account records from the home mortgage system and the equity system extract files are merged/compared to find all mismatched data;
- An annual review mismatch report is produced for all accounts where there is no home mortgage system information or where the equity system loan number from the home mortgage system does not match the equity system loan number from the mortgage system. This report is reviewed for accuracy, and problem resolution is detailed as a manual exception process;
- Pull property valuation information and store with date for retrieval, wherein such information is retrievable by other systems or persons as this information can be used elsewhere. Property valuation data is gathered on the property via available property sources. A batch file is sent with the following fields: the equity system loan number, first mortgage original property value (sales price), zip code, and first mortgage loan closed date. The following fields are retrieved for each loan to be stored in the home asset management account annual review database: single value, confidence range, highest reasonable value, and lowest reasonable value;
- Home asset management account records on the equity system are filtered or tested for the annual review flag in the equity system equal to No;
- Home asset management account records on the equity system with No set in the annual property review flag field are excluded from the annual property review process at this point and populated with an annual review flag set to no as a reason code;
- Home asset management account records are filtered or tested for zero principal balance on the mortgage system. Loans are specially coded on the home mortgage system;
- Home asset management account records on the home mortgage system with a zero principal balance are excluded from the sweep process at this point and populated with a zero principal balance on the mortgage reason code;

Home asset management account records are filtered or tested for bankruptcy status on the home mortgage system;

Home asset management account records on the home mortgage system that are in bankruptcy status for the first mortgage are excluded from the annual review process at this point and are populated with a bankruptcy on the mortgage reason code;

Home asset management account records are filtered or tested for foreclosure status on the home mortgage system;

Home asset management account records that are in foreclosure for the first mortgage on the home mortgage system are excluded from the annual property review process at this point and are populated with a foreclosure on the mortgage reason code;

Home asset management account records are filtered or tested for a status of current on first mortgage on the home mortgage system for the previous twelve months. Current status on the first mortgage is defined as follows: if the current month is beyond the due month then the loan is not current. Payment must be received on or before end of the month of the due date month for the account to be current. To receive an annual review increase an account must have been current for all twelve months prior to the annual property review;

Home asset management account records that have not been current on the first mortgage for any of the previous twelve months on the home mortgage system are excluded from the annual review process at this point and populated with a not current on the first mortgage reason code;

Home asset management account records on the equity system are filtered or tested for current status for all of the previous twelve months on the second account. Home asset management account equity system accounts are filtered or tested for current status on the equity LOC. Current status is defined as payments received no more than 29 days from due date;

Home asset management account records that are not current for the equity LOC for the any of the previous twelve months on the equity system are excluded from the annual property review process at this point and are populated with a not current on the equity reason code;

A Fair Isaac standard credit score, FICO is determined by requesting credit bureau report (CBR) data. At a minimum, the CBR data are stored for two years in this step for all records. It is preferable to maintain a rolling two-year file of the CBR. It is preferable for the business to have online ability to review the current year and previous years' CBR that is pulled as part of the annual property review process accessed by the home mortgage system loan number, the equity system account number, SSN, customer last name and first initial and date, or property address. Such information is preferable to avoid situations where customers have to be called back because information is not readily available;

Credit data is gathered on the primary and secondary borrower;

Credit data is filtered and tested against a predetermined credit-risk FICO threshold, such as, 680. It is preferable to be able to reset the FICO threshold;

Home asset management account accounts that have lower than a predetermined score are excluded from the annual property review process at this point and are populated with a did not pass the FICO reason code. Then, the system defaults to turn off the sweeps for those account records. The Sweeps are turned off until the next anniversary date, or until a manual underwriting decision is conducted to reverse the system decision. If, on the next anniversary date, the FICO is above the predetermined score, then the sweeps are to be automatically turned back on. A customer's request to deactivate the sweep feature will override this rule. However, a customer's request to set sweeps to Yes does not override the FICO requirements. It should be appreciated that there are other reasons possible for a sweep to be turned off automatically;

Property valuation is compared to the higher of either the previous value or the original value. An increase is due only if the result of the comparison is a positive number. If a predetermined value, such as a property value index, is less than or equal to original property value, the amount of the annual review increase equals zero. At 100% CLTV, if such predetermined value is greater than the previous property value, the amount of annual property review increase is the difference between the two values. It is preferred that the original property appraised value is used for the very first annual review and thereafter the previous years' annual review property valuation is used;

Home asset management account records that have an amount of annual review increase of zero or a negative amount are excluded from the annual review process at this point and are populated with a property valuation that is equal to or less than previous value reason code;

Home asset management account loans are filtered for the Maximum Combined Loan to Total Value limitations that are set by the customer and/or credit risk (CUST MAX CLTV and MAX CLTV, respectively). The lower of the two values in MAX CLTV and CUST MAX CLTV is used as the maximum amount allowed in the total new available line of credit including the proposed annual property review increase;

Home asset management account loans on the equity system are filtered or tested for the CUST MAX CLTV limitation. It is preferred that the location for these data fields reside on the equity system due to customer service issues;

Home asset management account loans that are above the CUST MAX CLTV are excluded from the annual review process at this point and populated with an exceeds CUST MAX CLTV reason code;

Home asset management account loans that reach the CUST MAX CLTV as a result of the annual review increase may have a partial annual review increase. These accounts should receive the partial increase and be populated with a partial annual review increase due to reaching customer maximum CLTV limit reason code;

Home asset management account loans are filtered or tested for the MAX CLTV limitation that is imposed by credit risk management at the time of origination;

Home asset management account loans that are above the MAX CLTV will be excluded from the annual review process at this point and populated with an "exceeds credit MAX CLTV" reason code;

Home asset management account loans that reach the MAX CLTV as a result of the annual review increase may have a partial annual review increase. These accounts should receive the partial increase and be populated with a "partial annual review increase due to credit MAX CLTV limit" reason code;

Home asset management account accounts are filtered and tested to determine if the new available equity LOC (all cumulative sweeps for the year plus the next anticipated sweep plus the annual review increase) exceeds a predetermined amount, such as, for example, 125% of the most recently recorded commitment amount and is equal or greater than a predetermined value, such as, for example $25,000, i.e. 125/25 filter;

Account records that potentially would receive a new available equity LOC that satisfies credit criteria, such as, for example, exceeding 125% and being equal to or greater than $25,000 of the most recent recorded amount are excluded from the annual property review automatic process and are populated with a need new lien recordation reason code. The sweep is to be automatically set to no for this account record, effectively turning off the sweep until a recordation is achieved. It is preferable to be able to access why the sweep is set to No, that the bank automatically set the flag to No, and that it is not possible for the customer to override this setting and request the sweep flag be set to Yes. It is preferable for equity underwriting to have a queue for these exceptions to be worked manually. Once the CBR is used due to failure of the 125/25 filter, then the credit bureau may be requested for all parties on the application for that account. Operations verbally verifies income/employment and then works to re-record new amount. Such data is preferably stored in the equity system. Such fields are used by business in the equity system to show a history of activity, including the re-recordation of the lien. The business also has the ability to track the original commitment and any subsequent changes to that commitment. It should be appreciated that a partial increase to the upper most limit of the 125/25 threshold can be accommodated appropriately according to business requirements in the claimed invention herein;

The increase due to annual property review is recorded as a transaction in the equity system as an annual review increase to the available equity LOC amount on the equity system for all merged, matched account records that have passed all filters and tests. The transaction history is available within the annual review database;

Evaluating credit criteria. In the preferred embodiment, preferred credit criteria is as follows: if the line is increased to over a predetermined amount, such as, for example, $250,000, then title insurance is required. A Financial Institutions Reform Recovery and Enforcement Act of 1989 (FIRREA) appraisal is thus required. If existing appraisal is not over one year old, then it is valid. A check on the stored appraisal value for all equity LOC balances equal to or greater than $250,000 is performed. If the appraisal date is older than one year, then a new FIRREA appraisal is manually ordered. However, if the appraisal was done for home mortgage, then the equity business reviews the appraisal and signs off on its value. A preferred automation is a list of all account records where the available equity LOC increase results in an available balance equal to or greater than, here, $250,000. Any remaining business requirements for the appraisal are handled via a manual process and procedure;

Store all credit data and property valuation information in the annual review database and extract file whether an equity LOC receives an increase or not;

The resultant annual property review increase (if a positive number) is rounded down to the nearest dollar for all merged, matched accounts that have passed all filters and tests to this point in the process;

For all equity LOC's that failed to receive an increase due to an annual review filter, information regarding the reason code, definition of the reason code and associated date, is preferably logged as a transaction visible to customer service representatives and equity operations;

It is preferable for the business to be able to retrieve historical changes to equity LOC's that failed to receive the annual review increase. The historical information preferably includes reason code and date of annual review failure. The valuation amount associated with that annual review and date is preferably retained;

The business preferably is able to retrieve historical changes to the annual property review yes/no flag, when, such as, date, and whether it was related to a customer choice or a business choice. It is preferable to track the status of the annual review Y/N field, why it was turned off, when it was turned off and if it is available to turn on or off by customer choice. Example: If the flag is set to N by failure of the 125/25 rule during an annual review, the date of the review and the failure of the annual review due to 125/25 is information that the business preferably retrieves;

An annual review failure report is produced for all accounts that failed any filter. This report is reviewed by customer service representatives and equity underwriting and appropriate actions are taken as determined and as defined in exception business processes;

EXCEPTION PROCESSING: If borrower requests an off-schedule equity LOC increase that is not associated with an appraised valuation, it is denied. Customers may request an appraisal at their expense if they believe that the indexed valuation provided by the tool is not sufficient. In this case the appraised valuation is used to grant an increase in the available equity LOC. It is preferable to provide a percentage valuation from the indexed tool to determine future valuations;

EXCEPTION PROCESSING: State by state requirements and restrictions are addressed in multiple ways. Some state requirements/restrictions can be built into the systems, e.g. no loans in Texas with a rate more than 12%. Others are dynamically addressed in state documents produced out of the Integrated Document Delivery System (IDDS) with language provided by the legal department. Others are done based on communication, e.g. no loans/lines are made if the combined first mortgage and equity LOC is at least the conforming loan limit and fees are limited to $500;

EXCEPTION PROCESSING: If customer opted out of the annual property value review and now requests that the annual review flag be set to Yes, and the last annual review occurred over 12 months previously or had never occurred, then the credit eligibility criteria and cap limitation logic is required before increasing the equity LOC and changing the annual review flag to Yes. It is preferable to have customer request indicator and date as well as business request indicator and date information provided;

EXCEPTION PROCESSING: Customers are able to switch to alternate home equity LOC programs with different program and credit criteria, if desired. Customers requesting to customer service, that sweep and annual review indicators be permanently switched to No, servicing changes the market code and the account is no longer be a home asset management account loan;

EXCEPTION PROCESSING: When a borrower falls below the FICO cut and subsequently obtains their credit report, and is able to dispute items on their CBR and achieve the predetermined score, equity operations conducts a manual review and provides a decision regarding the line increase; and EXCEPTION PROCESSING: If 125/25 rule is exceeded, a preferably manual review is performed to ensure that equity LOC is the only junior lien and provide a queue so that these exceptions are worked by equity underwriting. An appraisal and title may be needed. These are ordered manually through existing business processes. A manual business process to determine the action to be taken for customers that refuse to sign a new deed for recordation or have other liens is preferable.

It should be appreciated that credit related specific parameters, such as, for example, 125/25, and 680 FICO are by example only and are not exclusive. Such credit parameters are subject to change to be aligned with ever changing business rules reflecting a dynamically changing business.

It is preferable that the frequency of the generation of the annual review mismatch report be monthly. The preferred embodiment of the invention also provides an annual review summary report. An example list of information on the summary report contains, but is not limited to:

Month of the annual review;
Total number of loans processed for annual review;
Total number of loans with successful annual review;
Total number of loans that failed annual review because of test/filter failure;
Sub-total number of failed for annual review loans for each reason code;
Trending analysis section of report—line increases;
Number of loans with increase in value;
Number of loans with decrease in value;
Average value change;
Average value change by state and/or by zip code; and
Frequency of report: monthly after each annual review.

Following is an example of the information provided by an annual review failure report according to the preferred embodiment of the invention:

Review flag set to No;
Zero principal balance on mortgage;
Bankruptcy on the mortgage;
Foreclosure on the mortgage;
Not current on the mortgage;
Not current on the equity LOC;
Did not pass the FICO requirement;
Property valuation is equal to or less than previous value;
Exceeds CUST MAX CLTV;
Partial annual review increase due to reaching customer maximum CLTV limit;
Exceeds credit MAX CLTV;
Partial annual review increase due to credit MAX CLTV limit;
Need new lien recordation;
Partial annual review increase due to need for new lien recordation,
Frequency of report: monthly after each annual review; and
First time account exceeds $250,000 FIRREA requirement.

It should be appreciated that the preferred embodiment of the invention provides for users to have access to online reporting capability during normal business hours in customer service centers. Further, it is preferable that the annual property review is run by batch process and as a nighttime process in an 8-12 hour window.

It is further appreciated that throughout the discussion, it is the case that a customer possesses the right to rescind any increase to the equity LOC, also known as a customer's right of rescission.

The following has further been found to be in accordance with the preferred embodiment of the invention:

Customers are not granted an off-cycle equity LOC increase, i.e. off of the annual review cycle line increase unless they request a full appraisal of their property at their expense; and Business procedures and processes define work and research that is required by the customer service centers to increase the equity LOC for all paid in full accounts that have not been refinanced and customers desire the equity LOC increase. A verification that the paid in full account has not been refinanced and is truly a paid off home asset management account that is entitled to continue to receive the annual property review benefit is included in the process. Note that if a home asset management account loan refinances to a new home asset management account loan, it would still receive all benefits of the home asset management account program.

It has been found to be preferable that annual property review extracts and processing are performed within a forty-eight hour period. The equity LOC increase is determined prior to the extract of data for the quarterly position statements.

An Exemplary Position Statement

The preferred embodiment of the invention provides a position statement on a periodic, and preferably, quarterly basis that displays first mortgage and equity LOC account information for the home asset management account program. For purposes of simplicity of discussion, such periodic position statement is referred to equally as the quarter position statement, while it can also be referred to as a monthly position statement, and the like.

The purpose of a periodic statement is to keep the customer informed on the benefit and relationship between the first mortgage and equity LOC and the current value of the property. The statement reflects a conditional increase in the credit line due to sweeps. In addition, another position statement is generated at the time of annual property reviews, based on a customer anniversary date, to reflect conditional increases to the equity LOC due to the proposed increased property indexed value as reflected in an annual review. The two distinct position statements are referred to as the quarterly sweep position statement (QSPS) and the annual review position statement (ARPS). Collectively they are referred to simply as the position statement or the statement.

The preferred embodiment of the invention provides, but is not limited to the following:

The statement provides a summary total of the sweep transaction between the first mortgage and equity LOC that occurred since the distribution of the previous statement;

The statement provides the most recent results of the annual property value review increase to the available equity LOC, the proposed increase is dependent on if a customer has exercised his or her right of rescission within a predetermined right of rescission timeline;

The statement provides the loan balance of both the first mortgage and equity LOC;

The statement may provide a graph that summarizes how the property value is being utilized;

The QSPS is produced quarterly and the ARPS is produced annually during the month of the customer loan anniversary date;

The statement reflects, but is not limited to the following data elements:

First mortgage and equity LOC balance at beginning of period;
  First mortgage and equity LOC balance at end of period;
  Equity LOC available credit limit at beginning of period;
  Transaction for total amount of principal sweep from first mortgage principal reduction to equity LOC since last statement on QSPS;
  Transaction for total amount of property value increase based on annual property value review on ARPS;
  Statement preferably includes a summary of equity LOC with convertibility feature accounts;
  New equity LOC available credit limit at end of period;
  First mortgage account number;
  Equity LOC account numbers (includes loan conversions);
  Customer information, name, address, and property address;
  Customer selected CLTV cap;
  Clear information regarding phone number, such as an 800#, to single point of contact servicing site for customer questions;
  Date of the next annual review;

Servicing preferably requires security access to manually generate copy of the last statement issued on an exception basis and/or to request from print vendor;

Statement messaging and insert capability or, optionally, alternative marketing methods to home asset management account customers;

"Negative messaging" if sweep/annual review does not occur or if limits reached; and Dates covered by the statement.

Following are some assumptions for the position statements according to the preferred embodiment of the invention:

As no state specific legal issues/constraints regarding the content exists, one statement is generated for all states;
  Two separate billing statements for the first and equity LOC may be generated;
  The QSPS statement is a communication vehicle for the results of the sweep;
  The ARPS is a communication vehicle for the results of the annual review process;
  QSPS distribution is based on the calendar quarter. All statements are generated on the same time line;
  ARPS is based on loan anniversary date;
  Partial position statements acceptable for new accounts initiated in mid-quarter;
  All data accessible through history files or the annual review/sweep intersect file; and
  Print vendor is responsible for merging multiple extracts as applicable, and for meeting requests to re-print position statements as warranted by servicing.

The position statement benefits the customer by providing an overall view of the customer's home asset management account loan in comparison to the customer's property value.

It should be appreciated that the preferred embodiment of the invention provides a position statement that is consistent with other statements reflecting part or all of the same information, such as, for example, portfolio management account statements and mortgage statements.

An Exemplary Decisioning Feature

The preferred embodiment of the invention provides an automated decisioning feature of home equity products at point of sale for home mortgage consultants. Decisioning refers to making a credit-related approve or refer decision on a loan application. This preferably includes the home asset management account as well as all simultaneous close equity and mortgage business. Decisioning functionality is implemented to allow automated decisions to be retrieved from decisioning systems, proprietary or otherwise. Incorporating the results of automated decisioning systems improves the ease of doing business on both the home asset management account as well as all simultaneous close business. By allowing both the first mortgage and the equity LOC to be simultaneously decisioned through one process, eliminates otherwise additional time and steps. Additionally from a risk management perspective, the use of manual delegated underwriting is replaced with the automation of credit policy and credit risk rules to ensure consistency.

The preferred embodiment of the invention provides the following:

Using auto decisioning for all loans with the home asset management account via a decision server;
  Using auto decisioning for all eligible simultaneous close loans with home equity as the lender on the equity LOC via a decision server;
  Integrating equity and mortgage's credit policies to decision engine;
  Allowing home mortgage consultants to run multiple application scenarios on the first mortgage and equity LOC prior to finalizing the application;
  The decision server (engine) supporting the decisioning of the home equity products; and
  Passing amount disbursed on the equity line of credit to the decision server to calculate the total loan to value (TLTV) for documentation purposes.

Following are some assumptions for the exemplary decisioning process that may apply according to the preferred embodiment of the invention:

The actual sales and operational processes are different for each line of business within home mortgage;
  Decisioning returns an approved or referred response, i.e. the engine never results in a decline;
  Decisioning for a complete and eligible loan application will return a response for the first mortgage, a response for the equity LOC, and a combined decision. If the response for the first mortgage or for the equity LOC is refer, the combined decision is refer;
  First mortgage loans that receive a caution risk class from the decision server are ineligible for home equity financing. A decision server message will fire indicating that the transaction is ineligible. It is preferable to put in place an exception to the caution when there's erroneous information that can not be easily corrected within the system;
  It should be appreciated that automated decisioning delivers a quicker and more consistent response on the equity LOC than a manually delegated process;
  Pricing engine has eligibility/exclusion rules in place for fields that are currently passed to home mortgage pricing engine;
  Adaptable to use alternative referral sources;
  Assumes investor acceptance of proposal;

Such assumptions apply to some prior point-of-sale and fulfillment systems for home mortgage;

Mortgage is responsible for the credit risk on the first mortgage and equity is responsible for the credit risk on the subordinate financing, such as the equity LOC or second mortgage loan;

The manual delegated underwriting process is discontinued for some processes; and For home asset management account loans, the equity LOC is in second lien position.

The automated decisioning feature allows for the home mortgage consultant (HMC) to have more control for assisting customers as in, but not limited to, the following, i.e. impacts on sales process:

HMC collects home equity loan requirements and inputs into appropriate systems;

HMC manually prices home equity loans and quotes the appropriate rate or optionally a home equity pricing engine provides pricing. However, the home mortgage pricing engine has rules to validate eligibility for certain products;

HMC continues to submit and receive decision results as normal, but now also receive a combined decision, i.e. the first mortgage equity LOC decision on particular loans;

HMC is able to issue enhanced approval letters on transactions if the combined home equity and home mortgage automated decision response is approve; and Caution loans are ineligible for home equity financing and therefore the HMC is responsible for restructuring the deal at point of sale.

Incorporation of the automated decisioning feature impacts the operations side of business. Following is a list of operations process impacts from the automated decisioning feature according to the preferred embodiment of the invention:

Operations preferably reviews all automated decision results, including certain messaging related to products;

Operations preferably coordinates home equity decision into process, including working with home equity operations on referred loans and communicating changes to home equity required information to ensure data accuracy between systems and provide quality customer service, i.e. cancellations, declines, counter offers, and changes in loan terms;

A commitment letter supports approval and closing conditions for both home mortgage and equity;

Operations is responsible for conditioning the home mortgage and home equity loan requirements appropriately; and Operations preferably coordinates closing and settlement with home equity.

Incorporation of the automated decisioning feature impacts the telecommunication sales (telesales) side of business. Following is a list of telesales process impacts from incorporating the automated decisioning feature according to the preferred embodiment of the invention:

Telesales representatives collect loan information for the first and second accounts and input into their system. Such system collects and displays application data, which includes both mortgage and equity application information;

Telesales representatives can optionally manually price the home equity loan or line of credit and quote the rate as appropriate. Or, when available, use a home equity pricing engine. It should be appreciated that the home mortgage pricing engine has rules to validate eligibility for particular products;

Telesales representatives preferably notify home equity to generate disclosures on the second account. Equity operations continue to issue first disclosures;

Telesales representatives continue with handoff to the fulfillment division to process the application and submit the application for an automated decision;

A credit grade comes back from the decision server on the second account along with decisions on the first mortgage and equity LOC. Fulfillment preferably sends the information back to the telesales representatives so that telesales representatives can notify the borrower of the final interest rate on the equity LOC and input into the telesales system; and Ineligible loans preferably are restructured by the telesales representatives according to business rules.

Incorporation of the automated decisioning feature impacts the fulfillment process side of business. Following is a list of fulfillment process impacts from incorporating the automated decisioning feature according to the preferred embodiment of the invention:

Fulfillment receives a decision on the first mortgage and equity LOC and the borrower receives the combined decision;

A credit grade comes back from the decision server on the equity LOC along with the decisions on the first mortgage and equity LOC. Fulfillment preferably sends the information back to the telesales representatives, so that the telesales representatives can notify the borrower of the final interest rate on the equity LOC and input into the telesales system;

Fulfillment preferably reviews all automated decision results including messaging related to products;

Preferably include a code that identifies those loans that are ineligible and require restructuring;

Fulfillment preferably coordinates home equity decision into process, including working with home equity underwriters on referred loans and communicating changes to home equity to ensure data accuracy between systems and ensure quality customer service, e.g. cancellations, declines, counter offers, and change in loan terms;

Status codes are input accordingly by both home equity and home mortgage;

A commitment letter is preferably enhanced to support approval and closing conditions for both home mortgage and home equity. Fulfillment is responsible for conditioning home mortgage and home equity loan requirements appropriately;

A preferred client approval (PCA) letter is generated to incorporate both the first mortgage and equity LOC on PCA loans;

In the case of a referral on the equity LOC, fulfillment notifies home equity to perform a manual underwrite;

Fulfillment coordinates closing/settlement with home equity; and

Home equity outbound group that handles overflow volume preferably is trained on the process as a contingency.

Incorporation of the automated decisioning feature impacts the sales delivery connection (SDC) channel pertaining to the delegated underwriting of loans for both sales and operations. Following is a list of the underwriting of loans process impacts on sales from incorporating the automated decisioning feature according to the preferred embodiment of the invention:

HMC continues to collect loan information for the first mortgage and the equity LOC;

HMC continues to provide SDC with all appropriate data to complete application;

HMC preferably continues to price loan for SDC representatives;

Option 1:

HMC pulls tri-merge credit report, discloses, and quotes rate to the customer based on the credit score associated with the primary wage earner as identified by credit criteria; and Option 2:

HMC completes application and receives a credit score before quoting rate to borrower;

HMC receives a communication regarding the status of decision—either a copy of the commitment letter indicating approval for home asset management account or simultaneous close loans, representing the decision for the first mortgage and equity LOC. Or a suspense notification that occurs on referred decisions and any other loans that require additional documentation prior to decision;

HMC continues to communicate with SDC regarding any changes to first mortgage or equity LOC terms; and Caution loans are not eligible for home equity financing, therefore the HMC's preferably restructure the application.

Following is a list of the underwriting of loans process impacts on operations from incorporating the decisioning feature according to the preferred embodiment of the invention:

Operations continues to communicate new applications with a request for credit to trigger the disclosure;

Operations confirms rates with HMC after credit is pulled in the appropriate system and credit score is received;

Operations incorporates all new transaction risk messages, credit risk messages, and documentation requirements on home asset management account and particular loans into their process;

SDC continues to coordinate home equity decisions into process, including working with HMC, home equity underwriter on referred loans, and communicating changes to home equity regarding required information to ensure data accuracy between systems and ensure customer service, e.g. scheduling closing, cancellations, declines, counter offers, and changes in loan terms;

The commitment letter is enhanced to support approval and closing conditions for both home mortgage and home equity. Operations is responsible for conditioning the home mortgage and home equity loan requirements appropriately; and Caution loans are ineligible for home equity financing, therefore operations preferably restructures the deal.

Following is a list of the compliance process impacts from incorporating the automated decisioning feature according to the preferred embodiment of the invention:

If the application is taken via phone, the application is delivered to home equity within twenty-four hours of when the borrower agrees to go forward with the deal; and If the application is taken face to face, the application is delivered to home equity within twenty-four hours of the borrower signing the application.

It should be appreciated that the output from the decision system provides, but is not limited to the first mortgage results, the equity LOC results, the decision for the combined accounts, and the credit grade.

Following are example screen prints of an application showing the incorporation of the subordinate financing (equity LOC) for a borrower and the results of the automated decisioning system according to the preferred embodiment of the invention.

FIG. 1 is a screen print of the details of a transaction incorporating subordinate financing for subject property according to the invention. Line j 10 is a protected field for subordinate financing. The details button 20 on line j navigates to the screen depicted in FIG. 2. The value 130 in line j is equal to the amount disbursed plus line balances plus loan balances.

FIG. 2 is a screen print of the details of a transaction calculator incorporating subordinate financing for subject property according to the invention. The second section, Home Asset Management Account Features 210 provides a sweep feature Yes/No buttons 220 and annual review feature Yes/No buttons 230 according to the invention. The third section, Other Subordinate Financing Totals 240 provides line balances, payments, and limits, as well as loan balances and payments. It should be appreciated that features for credit card and convertibility can also be provided. Credit score determines the final interest rate from home equity, and credit grade and score is determined within the automated decisioning process; the credit grade field is preferably disabled until output is received from the decisioning system.

FIG. 3 is a screen print of the loan to value calculator according to the invention. A subordinate financing button 310 is provided to gather the subordinate financing amount and include it in the combined loan to value calculations.

FIG. 4 is a screen print of the results of applying for a combined loan according to the invention. The results information clearly distinguishes between the first mortgage information from subordinate financing. The following fields: decision status 410, decision results 420, decision engine key number 430, decision date/time, and decision engine transaction number 450 relate to the automated decisioning system. Also provided are the first mortgage results 460, the second mortgage results 470, i.e. subordinate financing, and the credit grade 480 of the home asset management account.

FIG. 5 is an example of a subordinate financing screen for subject property according to the invention. Input fields for the home equity subordinate financing are provided in the top section 510. Check boxes 520 for turning on the sweep and/or annual review features are provided. Input fields for non-home equity new financing are provided in the middle section 530.

Figure 6A:
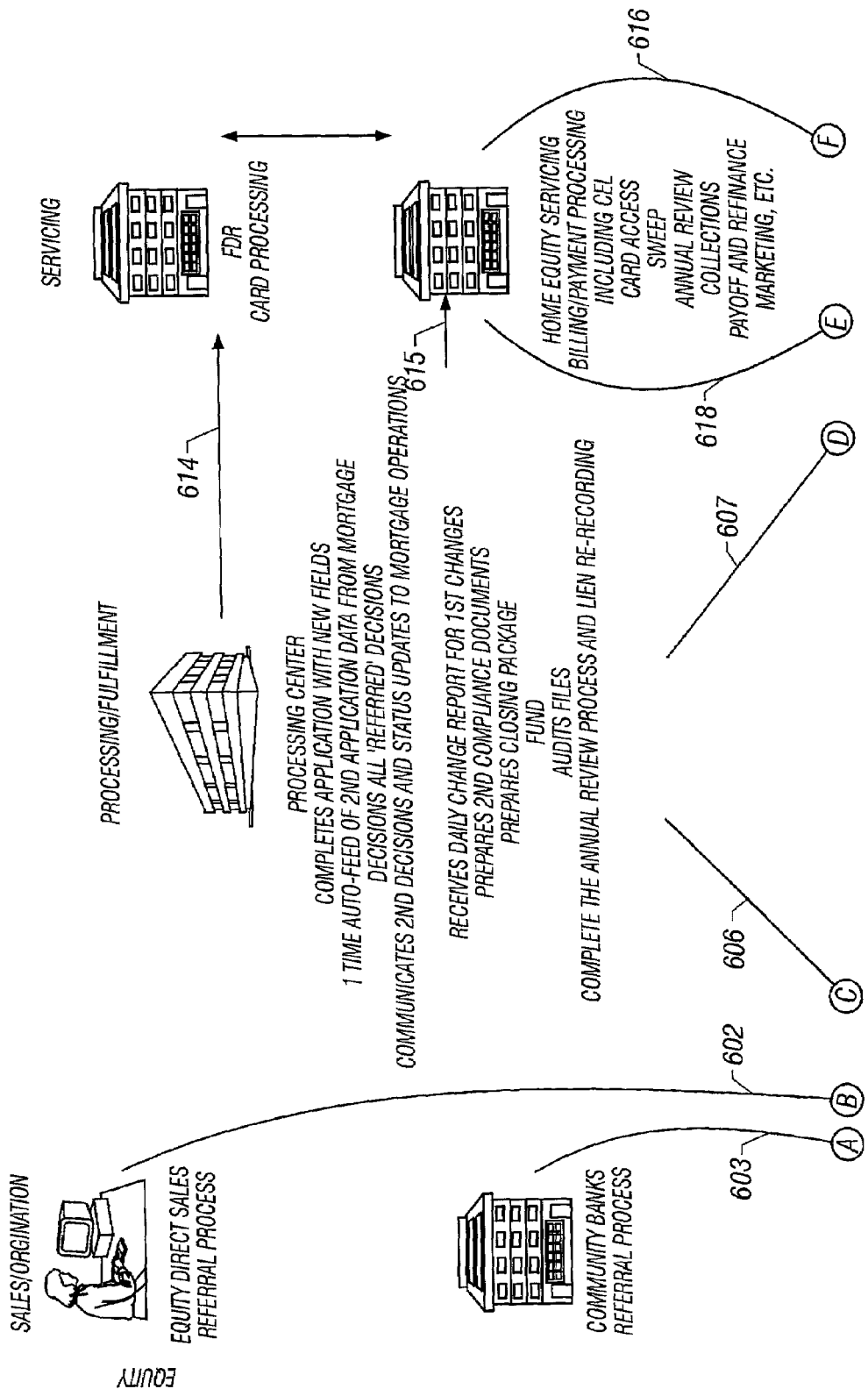
FIG. 6 is a schematic diagram showing the home asset management account work flow according to the invention.
Figure 6B:
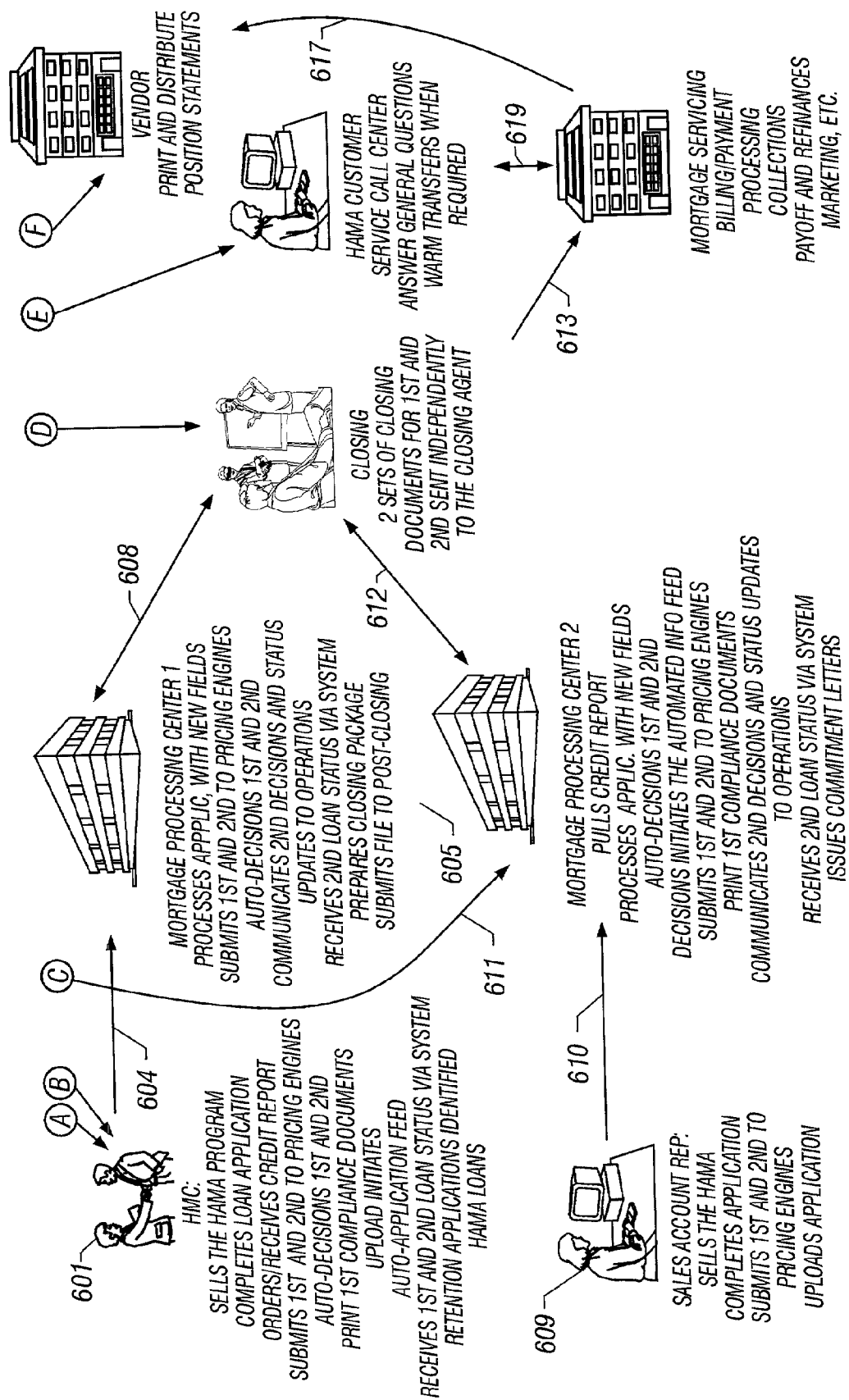

FIG. 6 is a schematic diagram showing the home asset management account work flow according to the invention. The home mortgage consultant (HMC) sells the home asset management account program to a customer (601). Typically, the customer is referred to the HMC by a referral process in equity sales (602) or by a referral process in community banks (603). The preferred embodiment of the invention provides means for the HMC to complete a loan application with the customer for the customer; order and receive credit reports; submit first and second account information to appropriate pricing engines; request automated decisioning on the first and second accounts; print compliance documents on the first mortgage and equity LOC; upload initiates automated application feeds; receive first and second loan statuses via the claimed system; and identify home asset management account loans in retention systems. The HMC submits information gathered or requested to a first mortgage processing and fulfillment center (604).

The first mortgage processing and fulfillment center provides means for further processing that includes any of, but is not limited to, processing the appropriate home asset management account application; submitting first and second account information to appropriate pricing engines; requesting automated decisioning on the first and second accounts; communicating decisions on the second account and status updates to operations; receiving status on second loan; preparing a closing package; and submitting files to post closing procedures (605).

The first mortgage processing center communicates with the processing center for equity (606) by providing information for further processing and for retrieving information and results. The equity processing center provides the means for accomplishing, but not limited to the following: completing the home asset management account application; receiving a one-time automated data feed of the loan application information from the mortgage processing centers; making decisions on all referred decisions; communicating decisions on the second account and providing status updates to the mortgage operations; receiving daily change notices pertaining to first mortgage changes; preparing compliance documents on the equity LOC; preparing closing packages; handling funds; auditing files; and completing the annual review process and lien re-recording.

The first mortgage processing center and the equity processing center submit respective closing documents for the first mortgage and equity LOC, respectively to the closing agent (607) and (608).

Alternatively, a sales account representative sells the home asset management account program to a customer (609). The preferred embodiment of the invention provides means for the sales representative to start and use a sales application having fields for gathering information on the home asset management account; submitting first mortgage and equity LOC information to appropriate pricing engines; and uploading the application now populated with customer information to an equity LOC processing and fulfillment center (610).

The equity LOC processing center is in communication with the mortgage processing center (611) and provides means for, but is not limited to the following: pulling credit reports; processing the appropriate home asset management account application; making automated decisions on the first mortgage and equity LOC; allowing the decision to initiate an automated information feed into the appropriate subsystems; submitting first mortgage and equity LOC information to appropriate pricing engines; printing compliance documents on the first mortgage account; communicating decisions on the equity LOC and status updates to operations; receiving loan status information on the equity LOC; and issuing commitment business letters.

The equity LOC processing center submits closing documents for the equity LOC to the closing agent (612).

It should be appreciated that while the preferred embodiment provides a first mortgage and equity LOC processing center, clearly the functionality provided by both can be on one to many processors depending on design.

The closing agent sends documents to a mortgage servicing center (613). The mortgage servicing center has the ability to handle billing and payment processing; collection processing; payoff and refinance processing; and some marketing and other related processes.

Likewise, the equity processing center has the ability to communicate with card processing centers (614), and with home equity servicing centers (615) that perform billing and payment processing, including equity line of credit with convertible features, card access processing, the sweep and annual review processes, collections processing; payoff and refinancing processing; and some marketing and other related processes.

Both the home equity servicing center and the mortgage servicing center in the preferred embodiment of the invention use a vendor for printing and distributing position statements (616) and (617), respectively. Also, the home equity servicing center and the mortgage servicing center are in communication with a home asset management account customer service center, (618) and (619), respectively. In a preferred embodiment, the customer service center is a call center that provides answers to general questions and calls upon the information and expertise of the equity and mortgage servicing centers as necessary.

Figure 7:
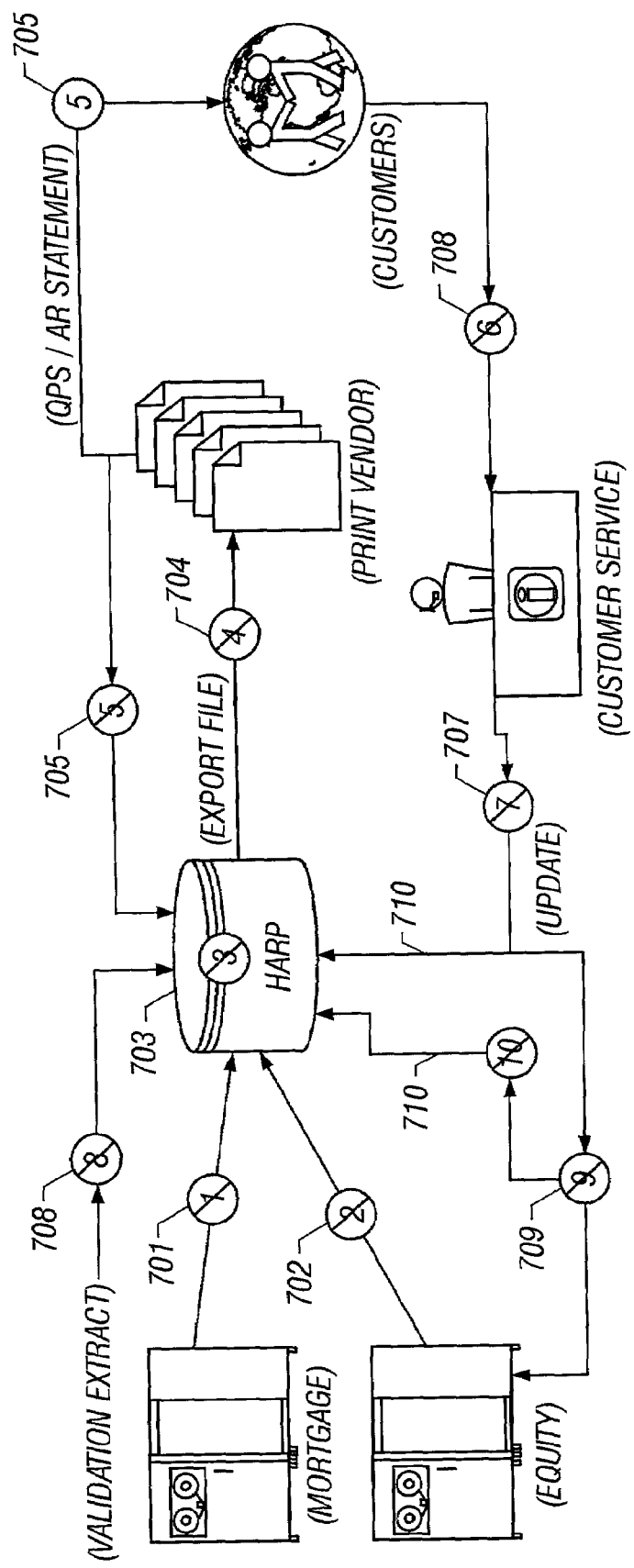
FIG. 7 is a schematic diagram showing process flow for sweep transactions and property review according to the invention.

FIG. 7 is a schematic diagram showing process flow for sweep transactions and annual property review according to the invention. The flow assumes quarterly sweeps. However, other timely periodic sweeps, such as, for example, monthly are possible in an equally preferred embodiment of the invention.

An annual property review file is created on approximately the fifteenth of every month. A sweep file for a business quarter is created in the last month of the calendar quarter. Data sources for such annual review file and sweep file are from a mortgage system (701) and from an equity system (702), respectively.

In a home asset management annual review database (703) the following is performed. Annual review files are merged, filtered, reported, and sent to a print vendor (704). Likewise, sweep files are merged, filtered, reported, and sent to the print vendor (704). However, if the current month is a quarterly month, then the annual review records are held for updates prior to being sent to the print vendor (704).

The print vendor distributes the quarterly sweep position statement (QSPS) and the annual review position statement (ARPS) to customers (705) and sends, such as by email, a corresponding mail confirmation file back to the Home Asset Management Report database (HARP) (705).

If desired, a customer contacts a servicing entity with regards to any statement (706). The intersect database and associated application enables the customer service entity, preferably by a graphical user interface (GUI), the following: recording of a customer's right of rescind, finding associated current and historical statements, and requesting such found statements be reprinted by the print vendor (707). It should be appreciated that at the end of an expiration of a predetermined right of rescission period, eligible amounts of credit are swept to the equity line of credit.

Validation data is extracted from the mortgage origination systems (708) to determine any rescinded amount of credit and record non-sufficient funds (NSF), and for thus withholding such records from being used to update the equity system.

Valid sweep transactions are updated to the equity database (709), and back to the mortgage and equity intersect database (710). The intersect application updates such annual review files and/or records that were held prior to being sent to the print vendor. Also, the annual review files and/or records are updated with sweep transactions results.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for home asset management, comprising:
providing a first mortgage, having a principal balance;
providing an equity line of credit (LOC);
performing automatically a periodic principal sweep and line increase offer from said first mortgage into said equity LOC, comprising the steps of:
  identifying home asset management account loans on a preexisting mortgage system associated with said first mortgage;
  pulling home asset management account loans and all necessary data fields per mortgage account into a first extract file;
  identifying home asset management account loans on a preexisting equity system associated with said LOC;
  pulling home asset management account loans and all necessary data fields per equity account into a second extract file;
  merging and comparing all home asset management account loans from the preexisting mortgage system and the preexisting equity system extract files and storing said merged file in an intersect database;
  filtering and testing said home asset management equity accounts for a sweep flag equal to No in the preexisting equity system;
  excluding from the sweep process home asset management equity accounts with No set in the sweep flag field and populating with a sweep flag set to no reason code;
  filtering the home asset management mortgage accounts for bankruptcy status, wherein the home asset management mortgage accounts that are in bankruptcy status on the first mortgage are excluded from the sweep process at this point and are populated with a bankruptcy on the first mortgage reason code;
  filtering the home asset management mortgage accounts for foreclosure status, wherein the home asset management mortgage accounts that are in foreclosure on the first mortgage are excluded from the sweep process at this point and are populated with a foreclosure on the first mortgage reason code;
  filtering home asset management mortgage accounts for current status on first mortgage, where current status on the first mortgage is defined as if the current month is beyond the due month then the loan is not current and payment must be received on or before end of the month of the due date month to consider the account current, and wherein the home asset management mortgage accounts that are not current on the first mortgage are excluded from the sweep process at this point and populated with a not current on the first mortgage reason code;
  filtering home asset management equity accounts for current status on the equity LOC, wherein the home asset management equity accounts that are not current for the equity LOC are excluded from the sweep process at this point and are populated with a not current on the equity LOC reason code;
  identifying the first mortgage principal pay down amount and rounding said payment amount down to the nearest dollar for all merged and matched accounts that have passed all filters;
  sweeping automatically the first mortgage principal pay down amount to the available equity LOC amount on the preexisting equity system to effect an increase; and
performing automatically a periodic property value review of said first mortgage and an associated offer of an automatic line increase to said equity LOC.

2. The method of claim 1, wherein said periodic property and credit review is an annual review.

3. The method of claim 1, wherein said period sweep is a quarterly principal sweep.

4. The method of claim 1, further comprising:
providing a periodic position statement reflecting said sweep equity LOC increase, and a property valuation statement reflecting estimated change in property value and, if said offer is accepted, said associated automatic equity LOC increase.

5. The method of claim 4, wherein said periodic position statement is provided quarterly, and wherein said property valuation statement is provided annually.

6. The method of claim 1, further comprising:
providing automated decisioning results on any of said first mortgage, said equity LOC, and credit grade.

7. The method of claim 1, wherein said equity LOC is a renewable home equity line of credit with convertibility features.

8. The method of claim 7, wherein said renewable equity LOC provides a combined loan to value from 0.01 percent to 100 percent at time of loan closing.

9. The method of claim 1, further comprising any of:
allowing customer to complete one loan application;
providing customer with a single point of contact for processing;
allowing customer to receive one loan approval communication;
allowing customer to attend one loan settlement and/or simultaneous closing;
providing customer with a single point of contact for general servicing of questions;
performing a first annual review of credit and property value, wherein if customer passes said annual and credit review, customer's equity LOC increases to a maximum combined loan to value pre-established taking advantage of an increased value of said property;
increasing said equity LOC based on principal reduction sweeps, wherein as said principal balance on said first mortgage is paid down, said equity LOC increases, said increased amount allowable up to an upper limit of approved credit limits;
initially operating said principal reduction sweep in a calendar quarter following a first anniversary of simultaneous accounts closing and operating subsequent sweeps thereafter on said periodic basis;
increasing said equity LOC based on said periodic review of credit and property values, wherein said periodic review is annual, and wherein said equity LOC does not decrease based on a decrease in property value;
providing a customer with communication regarding said periodic sweeps and reviews results via a position statement, wherein said sweeps are quarterly and said review is annual;
providing a base equity line product that is a convertible equity line thereby providing ability to convert portions of said equity LOC up to a predetermined number of loans with a fixed interest rate and term at a time, and up to a maximum number of loans over a number of years;

making available an expanded array of mortgage products including most or all conforming and non-conforming conventional products;

providing card access and/or convenience checks to equity LOC funds;

providing automated decisioning capabilities at point of sale and operations;

providing a one-time automated application information feed from established data centers or systems on home asset management account loans and simultaneous close loans;

facilitating enhanced sales and operations communication between components by providing daily loan status updates on said equity LOC;

providing automated pricing for said equity LOC at point of sale and operations;

providing enhanced marketing and retention functionality to identify and appropriately segregate customers; and automated populating first mortgage and equity LOC delinquency accounts with information on existing collections systems.

10. The method of claim 1, wherein said first mortgage and equity LOC are priced as separate products.

11. The method of claim 1, wherein a mortgage entity is responsible for credit risk on said first mortgage and an equity entity is responsible for credit risk on said equity LOC.

12. The method of claim 1, further comprising:
using any of mortgage and home equity pricing engines.

13. An apparatus for home asset management account loans, comprising:
means for providing a first mortgage, having a principal balance;
means for providing an equity line of credit (LOC);
means for performing automatically a periodic principal sweep and line increase offer from said first mortgage into said equity LOC, comprising the steps of:
means for identifying home asset management account loans on a preexisting mortgage system associated with said first mortgage;
means for pulling home asset management account loans and all necessary data fields per mortgage account into a first extract file;
means for identifying home asset management account loans on a preexisting equity system associated with said LOC;
means for pulling home asset management account loans and all necessary data fields per equity account into a second extract file;
means for merging and comparing all home asset management account loans from the preexisting mortgage system and the preexisting equity system extract files and storing said merged file in an intersect database;
means for filtering and testing said home asset management equity accounts for a sweep flag equal to No in the preexisting equity system;
means for excluding from the sweep process home asset management equity accounts with No set in the sweep flag field and populating with a sweep flag set to no reason code;
means for filtering the home asset management mortgage accounts for bankruptcy status, wherein the home asset management mortgage accounts that are in bankruptcy status on the first mortgage are excluded from the sweep process at this point and are populated with a bankruptcy on the first mortgage reason code;
means for filtering the home asset management mortgage accounts for foreclosure status, wherein the home asset management mortgage accounts that are in foreclosure on the first mortgage are excluded from the sweep process at this point and are populated with a foreclosure on the first mortgage reason code;
means for filtering home asset management mortgage accounts for current status on first mortgage, where current status on the first mortgage is defined as if the current month is beyond the due month then the loan is not current and payment must be received on or before end of the month of the due date month to consider the account current, and wherein the home asset management mortgage accounts that are not current on the first mortgage are excluded from the sweep process at this point and populated with a not current on the first mortgage reason code;
means for filtering home asset management equity accounts for current status on the equity LOC, wherein the home asset management equity accounts that are not current for the equity LOC are excluded from the sweep process at this point and are populated with a not current on the equity LOC reason code;
means for identifying the first mortgage principal pay down amount and rounding said payment amount down to the nearest dollar for all merged and matched accounts that have passed all filters;
means for sweeping automatically the first mortgage principal pay down amount to the available equity LOC amount on the preexisting equity system to effect an increase; and
performing automatically a periodic property value review of said first mortgage and an associated offer of an automatic line increase to said equity LOC.

14. The apparatus of claim 13, wherein said periodic property and credit review is an annual review.

15. The apparatus of claim 13, wherein said period sweep is a quarterly principal sweep.

16. The apparatus of claim 13, further comprising:
a periodic position statement reflecting said sweep, equity LOC increase, and a property valuation statement reflecting estimated change in property value and, if said offer accepted, said associated automatic equity LOC increase.

17. The apparatus of claim 16, wherein said periodic position statement is provided quarterly, and wherein said property valuation statement is provided annually.

18. The apparatus of claim 13, further comprising:
automated decisioning results on any of said first mortgage, said equity LOC, and credit grade.

19. The apparatus of claim 13, wherein equity LOC is a renewable home equity line of credit with convertibility features.

20. The apparatus of claim 19, wherein said renewable equity LOC provides a combined loan to value from 0.01 percent to 100 percent at time of loan closing.

21. The apparatus of claim 13, further comprising any of:
means for allowing customer to complete one loan application;
means for providing customer with a single point of contact for processing;

means for allowing customer to receive one loan approval communication;

means for allowing customer to attend one loan settlement and/or simultaneous closing;

means for providing customer with a single point of contact for general servicing of questions;

means for performing a first annual review of credit and property value, wherein if customer passes said annual and credit review, customer's equity LOC increases to a maximum combined loan to value pre-established taking advantage of an increased value of said property;

means for increasing said equity LOC based on principal reduction sweeps, wherein as said principal balance on said first mortgage is paid down, said equity LOC increases, said increased amount allowable up to an upper limit of approved credit limits;

means for initially operating said principal reduction sweep in a calendar quarter following a first anniversary of simultaneous accounts closing and operating subsequent sweeps thereafter on a said periodic basis;

means for increasing said equity LOC based on said periodic review of credit and property values, wherein said periodic review is annual, and wherein said equity LOC does not decrease based on a decrease in property value;

means for providing a customer with communication regarding said periodic sweeps and reviews results via a position statement, wherein said sweeps are quarterly and said review is annual;

means for providing a base equity line product that is a convertible equity line thereby providing ability to convert portions of said equity LOC up to a predetermined number of loans with a fixed interest rate and term at a time, and up to a maximum number of loans over a number of years;

means for making available an expanded array of mortgage products including most or all conforming and non-conforming conventional products;

means for providing card access and/or convenience checks to equity LOC funds;

means for providing automated decisioning capabilities at point of sale and operations;

means for providing a one-time automated application information feed from established data centers or systems on home asset management account loans and simultaneous close loans;

means for facilitating enhanced sales and operations communication between components by providing daily loan status updates on said equity LOC;

means for providing automated pricing for said equity LOC at point of sale and operations;

means for providing enhanced marketing and retention functionality to identify and appropriately segregate customers; and means for automated populating first mortgage and equity LOC delinquency accounts with information on existing collections systems.

22. The apparatus of claim 13, wherein said first mortgage and equity LOC are priced as separate products.

23. The apparatus of claim 13, wherein a mortgage entity is responsible for credit risk on said first mortgage and an equity entity is responsible for credit risk on said equity LOC.

24. The apparatus of claim 13, further comprising:

means for using any of mortgage and home equity pricing engines.

\* \* \* \* \*